United States Patent
Mori

[11] Patent Number: 5,921,803
[45] Date of Patent: Jul. 13, 1999

[54] TERMINAL FOR CHARGING CONNECTOR

[75] Inventor: Shigeo Mori, Shizuoka, Japan

[73] Assignee: Yazaki Corporation, Tokyo, Japan

[21] Appl. No.: 08/602,343

[22] Filed: Feb. 16, 1996

[30] Foreign Application Priority Data

Feb. 17, 1995 [JP] Japan .................................... 7-029775

[51] Int. Cl.$^6$ ................................................ H01R 4/24
[52] U.S. Cl. ........................................ 439/387; 439/843
[58] Field of Search .................................. 439/387, 843, 439/839, 271, 272

[56] References Cited

U.S. PATENT DOCUMENTS

| | | | |
|---|---|---|---|
| 2,346,831 | 4/1944 | Drury | 439/839 |
| 3,243,868 | 4/1966 | Anderson et al. | 439/843 |
| 3,316,528 | 4/1967 | Juris et al. | 439/839 |
| 3,641,479 | 2/1972 | O'Brien et al. | 339/94 R |
| 4,033,654 | 7/1977 | Ross | 439/843 |
| 4,168,878 | 9/1979 | Risser et al. | 439/839 |
| 4,597,620 | 7/1986 | Lindner et al. | 439/352 |
| 5,146,678 | 9/1992 | Lien | 29/857 |
| 5,389,003 | 2/1995 | Van Steenwyk et al. | 439/191 |

FOREIGN PATENT DOCUMENTS

| | | |
|---|---|---|
| 63-124383 | 5/1963 | Japan . |
| 602536 | 5/1948 | United Kingdom . |
| 2157100 | 10/1985 | United Kingdom . |

*Primary Examiner*—Hien Vu
*Attorney, Agent, or Firm*—Sughrue, Mion, Zinn, Macpeak & Seas, PLLC

[57] ABSTRACT

A charging connector terminal including an insertion port and a hollow portion into which a rod-like electrical contact portion of a male terminal is inserted. The hollow portion contains a spring for resilient contact with the electrical contact portion. A peripheral groove is formed in that portion of the hollow portion disposed between the spring and the insertion port, and an O-ring made of an elastic material is mounted in the peripheral groove, the O-ring having an inner diameter smaller than an outer diameter of the electrical contact portion. Preferably, a muddy water discharge surface defined by a tapering surface is formed on that portion of the hollow portion lying between the peripheral groove and the insertion port, the muddy water discharge surface being flaring toward the insertion port.

7 Claims, 5 Drawing Sheets

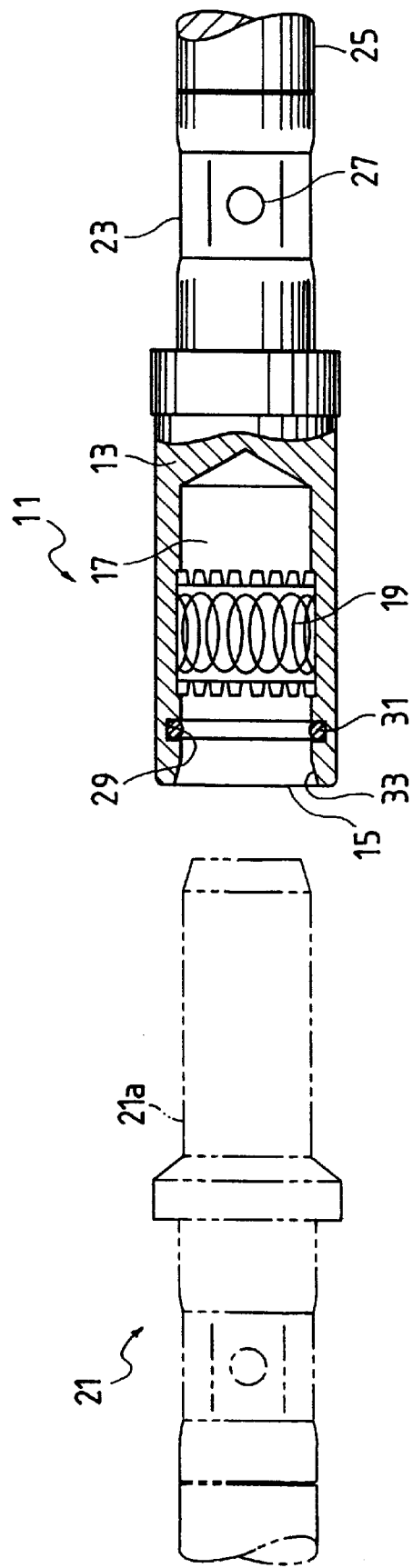
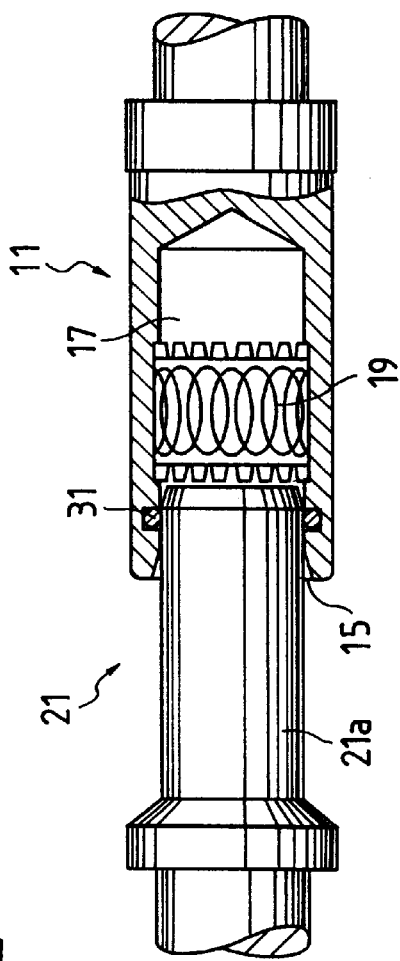
FIG. 1
FIG. 2

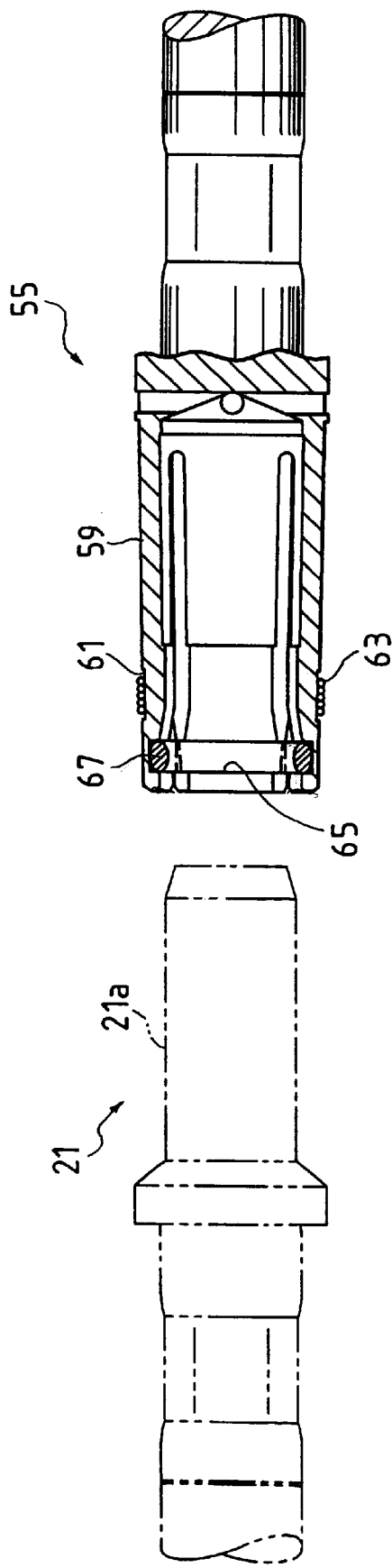
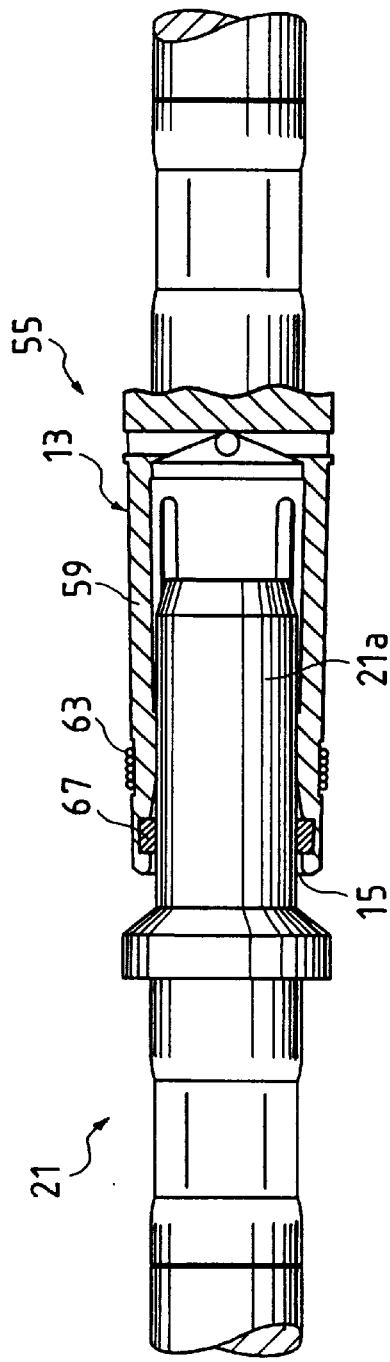
FIG. 10
FIG. 11

TERMINAL FOR CHARGING CONNECTOR

BACKGROUND OF THE INVENTION

1. Field of the Invention

This invention relates to a terminal for a charging connector which is used, for example, for an electric vehicle.

2. Description of the Related Art

The charging of an electric vehicle is usually effected by a power supply apparatus installed in a charging station as in the refueling of a gasoline vehicle. More specifically, as shown in FIG. 12, a charging connector 3 of a power feed cord 2 extending from a power supply apparatus 1 is connected to a charging connector mounted on the vehicle, and then electric power is supplied to a power source 4 contained in the vehicle.

The charging connector 3 comprises a male connector (not shown) and a female connector (described later) which can be fitted together. A male terminal inserted in the male connector is formed by cutting a solid metal blank of good electrical conductivity (e.g. a copper bar of a circular cross-section) into a rod-shape. On the other hand, a female terminal inserted in the female connector is formed by boring a copper bar of a circular cross-section into a cylindrical shape.

FIG. 13 is a cross-sectional view of a conventional female terminal disclosed in Japanese Patent Unexamined Publication No. Sho. 63-124383.

A resilient contact member 9 in the form of a cylindrical member of good electrical conductivity made of a metal sheet is received in a hollow portion 7 of a cylindrical female terminal 5, and the resilient contact member 9 has resilient contact strips 10 formed by blanking the metal sheet at circumferentially-spaced portions thereof.

When the male terminal is inserted into the hollow portion 7 of the female terminal having the resilient contact member 9, an electrical contact portion (not shown) of the male terminal contacts the resilient contact member 9, thus increasing the area of contact and the capacity of electric current.

In the conventional charging connector, however, the male terminal is first brought into contact with the resilient contact member, and therefore if muddy water or sand (hereinafter referred to as "muddy water or the like") is deposited on the male terminal, the muddy water or the like adheres to the resilient contact member 9, and intrudes into gaps between the resilient contact strips 10 and further into a gap between the hollow portion 7 and the resilient contact member 9. This leads to a problem that the resilient action is adversely affected, thereby increasing a terminal insertion/disengagement force. Furthermore, if muddy water or the like adheres to the resilient contact member 9, this causes a problem that the terminal is damaged and abraded by sand or the like.

SUMMARY OF THE INVENTION

The present invention has been made in view of the above problems, and an object of the invention is to provide a terminal for a charging connector in which muddy water or the like will not intrude into the female terminal, thereby preventing a terminal insertion/disengagement force from being increased, and also preventing wear of the terminal.

In achieving the above object, an aspect of the invention provides a charging connector terminal comprising: an electrical contact portion of a tubular construction having an insertion port and a hollow portion into which a rod-like electrical contact portion of a male terminal is inserted, the hollow portion having a peripheral groove formed at a side of the insertion port; resilient contact means contained in the hollow portion for resilient contact with the electrical contact portion of the male terminal; and an O-ring made of an elastic material mounted in the peripheral groove of the hollow portion, the O-ring having an inner diameter smaller than an outer diameter of the electrical contact portion of the male terminal.

Another aspect of the invention provides a charging connector terminal comprising: an electrical contact portion of a tubular construction having an insertion port and a hollow portion into which a rod-like electrical contact portion of a male terminal is inserted, the hollow portion having a peripheral groove formed at a side of the insertion port; resilient contact means contained in the hollow portion for resilient contact with the electrical contact portion of the male terminal; and an flexible ring member loosely fitted in the peripheral groove of the hollow portion, the ring member being interrupted at a portion thereof in a circumferential direction, and an inner diameter of the ring member being smaller than an outer diameter of the electrical contact portion of the male terminal while an outer diameter of the ring member is smaller than an inner diameter of the peripheral groove.

A further aspect of the invention provides a charging connector terminal comprising: contact plates formed by dividing a tubular electrical contact portion by slits extending in a terminal-inserting direction, the contact plates being elastically displaceable at their distal end portions radially of the electrical contact portion and having a peripheral groove in inner surfaces thereof; an auxiliary spring mounted on outer surfaces of the contact plates in a circumferential direction; and a flexible ring member fitted in the peripheral groove of the contact plates, the ring member being interrupted at a portion thereof in the circumferential direction, and an inner diameter of the ring member being smaller than an outer diameter of an electrical contact portion of a male terminal.

BRIEF DESCRIPTION OF THE DRAWINGS

FIG. 1 is a cross-sectional view of a charging connector terminal according to an embodiment of the present invention;

FIG. 2 is a cross-sectional view showing an initial stage of the fitting of the charging connector terminal;

FIG. 10 is a cross-sectional view of the charging connector terminal;

FIG. 11 is a cross-sectional view showing a fitted condition of the charging connector terminal;

DETAILED DESCRIPTION OF THE PREFERRED EMBODIMENTS

Figure 3:
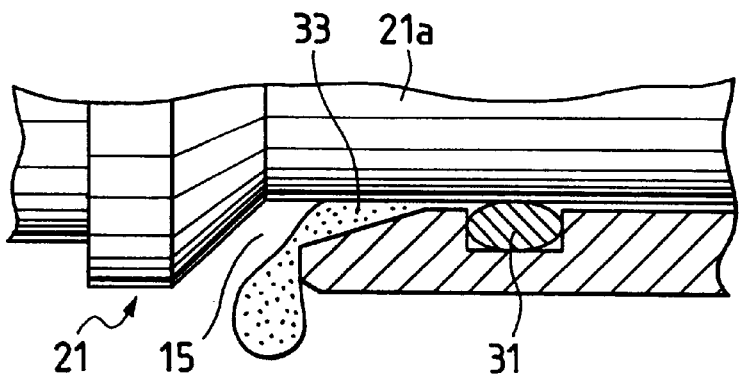
FIG. 3 is an enlarged view showing an insertion port of the charging connector terminal and its neighboring portion.

A preferred embodiment of a charging connector terminal of the present invention will now be described with reference to the drawings.

FIG. 1 is a cross-sectional view showing the charging connector terminal of the invention.

The charging connector terminal 11 in the form of a female terminal has an electrical contact portion 13 of a tubular construction which has an insertion port 15 at its front end. A spring 19 serving as a resilient contact means is received in a hollow portion 17 of the electrical contact portion 13 which communicates with the insertion port 15. The spring 19 is formed, for example, by blanking or stamping an electrically-conductive metal sheet and then by forming it into a cylindrical shape. The spring 19 contacts an electrical contact portion 21a of a male terminal 21 inserted into the hollow portion 17 through the insertion port 15. A wire connection portion 23 is formed rearwardly of the electrical contact portion 13, and the wire connection portion 23 is compressed and dimpled after a wire 25 is inserted into this wire connection portion 23. Reference numeral 27 in FIG. 1 designates a dimple or dent formed by this dimpling operation.

A peripheral groove 29 is formed in an inner surface of that portion of the hollow portion 17 disposed between the spring 19 and the insertion port 15, and this peripheral groove 29 is formed by cutting the inner surface of the hollow portion 17 in a radially outward direction. An annular elastic member 31 (e.g. O-ring of rubber) is mounted in the peripheral groove 29, and the inner diameter of the O-ring 31 is slightly smaller than the outer diameter of the electrical contact portion 21a of the male terminal 21. The O-ring 31, mounted in the peripheral groove 29, is mostly received in the peripheral groove 29, and only its inner peripheral portion projects into the hollow portion 17. Therefore, even when the electrical contact portion 21a of the male terminal 21 is inserted into the inner periphery of the O-ring, the O-ring will not be disengaged from the peripheral groove 29 by a frictional force applied thereto by the electrical contact portion 21a.

Although the O-ring 31 in the embodiment has a circular cross-section, it may have a square or triangular cross-section in so far as it is an annular rubber ring.

A muddy water discharge surface 33 is formed on that portion of the inner surface of the hollow portion 17 lying between the peripheral groove 29 and the insertion port 15, and this muddy water discharge surface 33 is tapered flaring (that is, increasing in diameter progressively) toward the insertion port 15.

The operation of the charging connector terminal 11 thus constructed will now be described.

FIG. 2 is a cross-sectional view showing an initial stage of the fitting of the charging connector terminal of the invention, and FIG. 3 is an enlarged view showing the insertion port of the charging connector terminal of the invention and its neighboring portion.

When the electrical contact portion 21a of the male terminal 21 is inserted into the insertion port 15 of the charging connector terminal 11 as shown in FIG. 2, the electrical contact portion 21a is first brought into contact with the inner periphery of the O-ring 31. When the male terminal 21 is further inserted, the O-ring 31 is elastically deformed and expanded to a size corresponding to the outer diameter of the electrical contact portion 21a, so that the O-ring 31 is held in intimate contact with the outer peripheral surface of the electrical contact portion 21a.

In this condition, when the male terminal 21 is further moved in the inserting direction, muddy water or the like deposited on the outer peripheral surface of the male terminal 21 is wiped off by the O-ring 31 held in intimate contact therewith, and therefore is prevented from intruding inwardly of the O-ring 31 in the inserting direction. The muddy water or the like, wiped off by the O-ring 31, collects on the muddy water discharge surface 33 as shown in FIG. 3, and as the amount of the collected muddy water or the like increases, it overflows, and is discharged from the insertion port 15. On the other hand, the electrical contact portion 21a, passed through the O-ring 31, has been deprived of the muddy water or the like to have the clean contact surface, and is brought into contact with the spring 19. Therefore, muddy water or the like will not adhere to the spring 19.

In the above-mentioned charging connector terminal 11, the O-ring 31 is provided at that portion of the hollow portion 17 disposed between the spring 19 and the insertion port 15, and the muddy water discharge surface 33 is formed on that portion of the hollow portion 17 lying between the O-ring 31 and the insertion port 15. With this construction, when the electrical contact portion 21a of the male terminal 21 is inserted into the insertion port 15 of the charging connector terminal 11, the O-ring 31 is held in intimate contact with the electrical contact portion 21a, and muddy water or the like deposited on the outer peripheral surface of the electrical contact portion 21a is wiped off by the O-ring 31. As a result, muddy water or the like will not deposit on the spring 19, so that the resilient action of the spring 19 will not be adversely affected, and therefore the insertion/ disengagement force is prevented from being increased, and besides damage and wear of the terminal due to muddy water or the like are prevented.

Another preferred embodiment of the charging connector terminal of the invention will now be described with reference to FIGS. 4 to 7.

Figure 4:
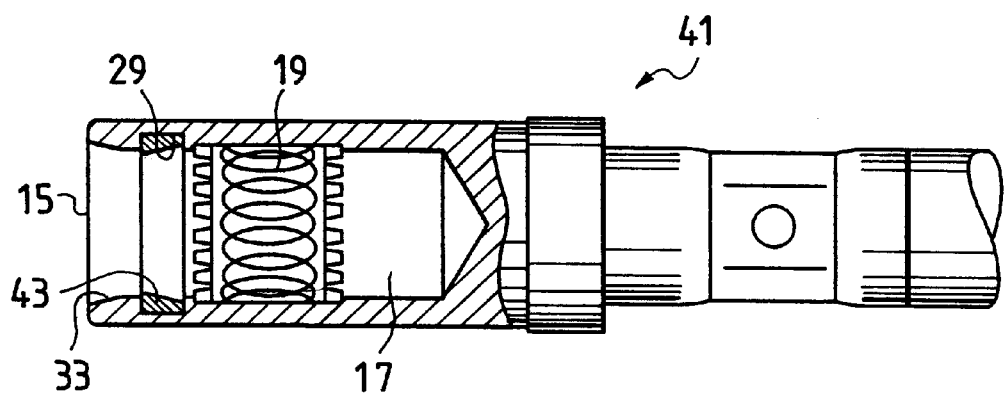
FIG. 4 is a cross-sectional view of a charging connector terminal according to another embodiment of the invention.
Figure 5:
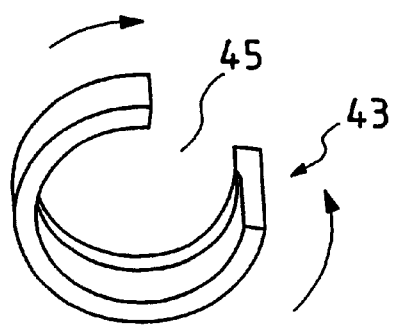
FIG. 5 is a perspective view of a ring member used in the embodiment.
Figure 6:
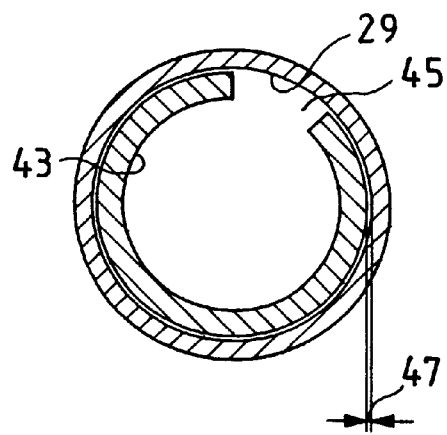
FIG. 6 is a cross-sectional view showing a fitted condition of the ring member.
Figure 7:
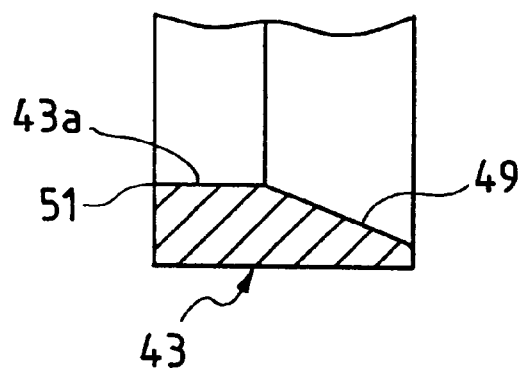
FIG. 7 is a cross-sectional view of the ring member.

FIG. 4 is a cross-sectional view of the charging connector terminal of this embodiment, FIG. 5 is a perspective view of a ring member used in this embodiment, FIG. 6 is a cross-sectional view showing a fitted condition of the ring member, and FIG. 7 is a cross-sectional view of the ring member.

In the charging connector terminal 41 of this embodiment, instead of the O-ring 31, a ring member 43 made, for example, of a resin material is received in a peripheral groove 29. The other construction is the same as in the above-mentioned charging connector terminal 11. The ring member 43 is flexible, and is interrupted at one portion thereof in a circumferential direction to assume a C-shape as shown in FIG. 5. In a normal condition of the ring member 43, its inner diameter is smaller than the outer diameter of the electrical contact portion 21a of the male terminal 21, and its outer diameter is slightly smaller than the inner diameter of the peripheral groove 29.

The ring member 43 can be flexed with a cut or interrupted portion 45 reduced, and hence can be reduced in diameter. The ring member 43 is thus reduced in diameter, and is received in the peripheral groove 29. The ring member 43 thus received in the peripheral groove 29 is elastically restored into a larger diameter to be fitted in the peripheral groove 29. When the ring member 43 is thus fitted in the peripheral groove 29, a slight clearance 47 is formed between the outer periphery of the ring member 43 and the peripheral groove 29 as shown in FIG. 6. Namely, the ring member 43 is loosely fitted in the peripheral groove 29 with a play.

The ring member 43 has a tapering surface 49 (see FIG. 7) formed at one open end portion thereof facing a spring 19, and this tapering surface 49 is flaring (that is, increasing in diameter progressively) toward the spring 19. Therefore, the electrical contact portion 21a of the male terminal 21 inserted into the inner periphery of the ring member 43 is brought into contact with a cylindrical inner peripheral surface 43a except the tapering surface 49. The other open end of the ring member 43 remote from the tapering surface 49 defines an edge portion 51.

The operation of the charging connector terminal 41 of this embodiment will now be described.

When the electrical contact portion 21a of the male terminal 21 is inserted into an insertion port 15 of the charging connector terminal 41, the electrical contact portion 21a is first brought into contact with the inner periphery of the ring member 43. When the male terminal 21 is further inserted, the ring member 43 is elastically deformed, so that its inner diameter is increased to a size corresponding to the outer diameter of the electrical contact portion 21a, and the ring member 43 is held in intimate contact with the outer peripheral surface of the electrical contact portion 21a.

In this condition, when the male terminal 21 is further moved in the inserting direction, muddy water or the like deposited on the outer peripheral surface of the male terminal 21 is wiped off by the edge portion 51 and the inner peripheral surface 43a of the ring member 43, and therefore is prevented from intruding inwardly of the ring member 43 in the inserting direction. As described above for the charging connector terminal 11, the muddy water or the like, wiped off by the ring member 43, collects on a muddy water discharge surface 33, and overflows to be discharged from the insertion port 15. The electrical contact portion 21a, passed through the ring member 43, has been deprived of the muddy water or the like to have the clean contact surface, and is brought into contact with the spring 19. Therefore, muddy water or the like will not adhere to the spring 19.

When the male terminal 21 is to be disengaged, the cylindrical inner peripheral surface 43a of the ring member 43 is held in intimate contact with the electrical contact portion 21a, with the tapering surface 49 not contacted therewith, and thus the area of contact thereof with the electrical contact portion 21a is decreased by an amount corresponding to the area of the tapering surface 49, and therefore a frictional resistance, developing when disengaging the male terminal, is smaller as compared with the case where the ring member 43 contacts the electrical contact portion over its entire inner peripheral surface.

In the above-mentioned charging connector terminal 41, the ring member 43 made of a resin material having the edge portion 51 is provided at that portion of a hollow portion 17 disposed between the spring 19 and the insertion port 15. Therefore, as in the above-mentioned charging connector terminal 11, muddy water or the like deposited on the outer peripheral surface of the electrical contact portion 21a is wiped off, and therefore the insertion/disengagement force is prevented from being increased, and besides damage and wear of the terminal are prevented. Since the tapering surface 49 is formed on the ring member 43, the frictional force developing between the ring member 43 and the electrical contact portion 21a is reduced, and therefore the disengagement force is further reduced.

In the charging connector terminal 41 of this embodiment, although the ring member 43 is interrupted at the cut portion 45 in the circumferential direction to assume a C-shape, the ring member 43 may be cut obliquely at one portion thereof in the circumferential direction, in which parallel oblique end surfaces are abutted against each other so that the ring member can be in a continuous condition.

A further preferred embodiment of the charging connector terminal of the invention will now be described with reference to FIGS. 8 to 11.

Figure 8:
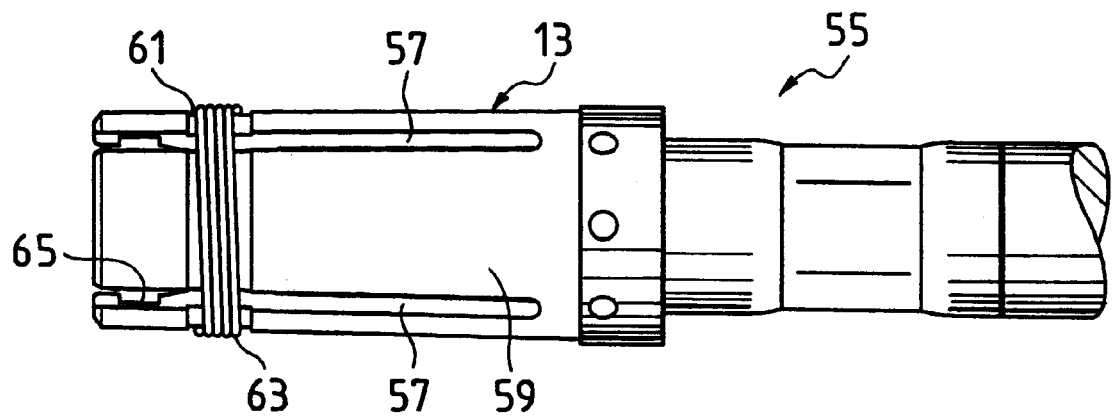
FIG. 8 is a side-elevational view of a charging connector terminal according to a further embodiment of the invention.
Figure 9:
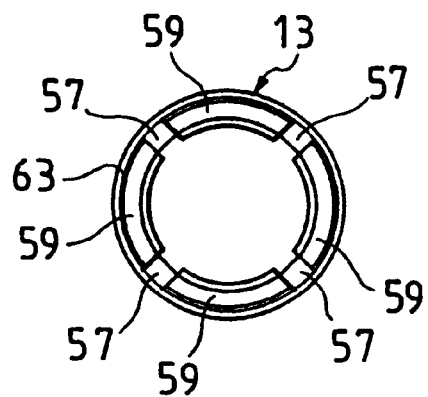
FIG. 9 is a front-elevational view of the charging connector terminal of FIG. 8.
Figure 12:
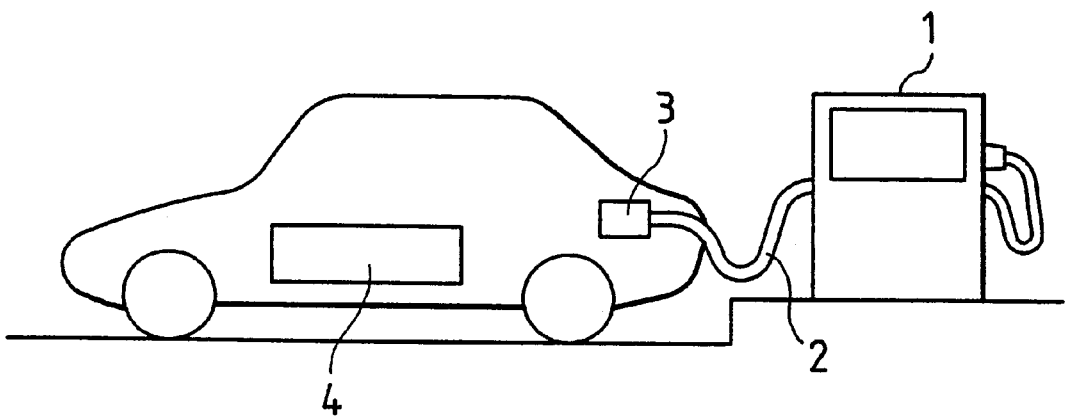
FIG. 12 is a view showing the charging of an electric vehicle at a charging station.
Figure 13:
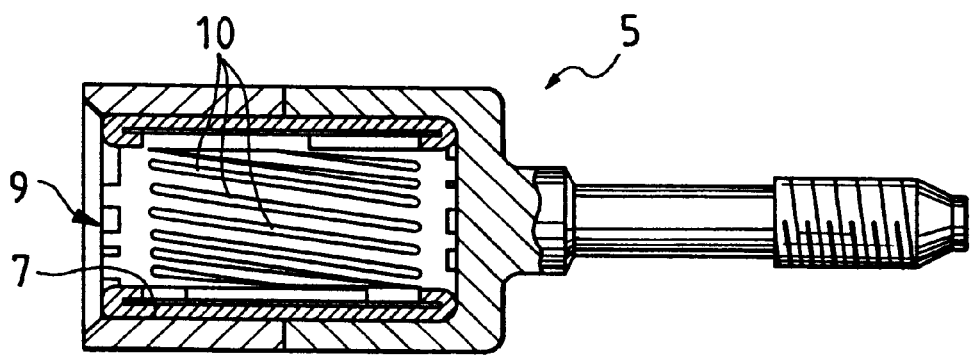
FIG. 13 is a cross-sectional view of a conventional female terminal.

FIG. 8 is a side-elevational view of the charging connector terminal of this embodiment, FIG. 9 is a front-elevational view of the terminal of FIG. 8, FIG. 10 is a cross-sectional view of the charging connector terminal of this embodiment, and FIG. 11 is a cross-sectional view showing a fitted condition of the charging connector terminal of this embodiment.

In the charging connector terminal 55 of this embodiment, an electrical contact portion 13 of a tubular construction is slotted or divided (for example, into four contact plates 59 in this embodiment) by slits 57 extending in a terminal-inserting direction. The contact plates 59 are elastically displaceable at their distal end portions radially of the electrical contact portion 13.

A circular outer groove 61, which is discontinuous or interrupted, is formed in the outer surfaces of the contact plates 59 in the circumferential direction. An auxiliary spring 63 is mounted in the outer groove 61, and urges the contact plates 59 radially inwardly. In this condition, the distance between each pair of opposed contact plates 59, that is, the inner diameter of the electrical contact portion 13 is slightly smaller than the outer diameter of the electrical contact portion 21a of the male terminal 21.

A circular peripheral groove 65, which is discontinuous or interrupted, is formed in the inner surfaces of the contact plates 59 in the circumferential direction. A ring member 67 of a resin material is fitted in the peripheral groove 65. The ring member 67 is flexible, and is interrupted at one portion thereof in the circumferential direction to assume a C-shape. In a normal condition of the ring member 67, its inner diameter is smaller than the outer diameter of the electrical contact portion 21a of the male terminal 21, and its outer diameter is substantially equal to the inner diameter of the peripheral groove 65. The ring member 67 can be reduced in diameter with its cut or interrupted portion reduced. The ring member 67 is thus reduced in diameter so that it can be received in the peripheral groove 65. The ring member 67, when received in the peripheral groove 65, is elastically restored to be fitted in the peripheral groove 65.

In the charging connector terminal 55 thus constructed, when the electrical contact portion 21a of the male terminal 21 is inserted into an insertion port 15 (see FIG. 11), the ring member 67 is elastically deformed, so that its inner diameter is increased to a size corresponding to the outer diameter of the electrical contact portion 21a. At this time, the contact plates 59, as well as the auxiliary spring 63, are displaced radially outwardly, and the ring member 67 is held in intimate contact with the outer peripheral surface of the electrical contact portion 21a. In this condition, when the male terminal 21 is further moved in the inserting direction, muddy water or the like, deposited on the outer peripheral surface of the male terminal 21, is wiped off by the ring member 67. The electrical contact portion 21a is thus deprived of the muddy water or the like to have the clean contact surface, and is brought into contact with the contact plates 59.

If the ring member 67 has a tapering surface similar to the tapering surface 49 of the above-mentioned ring member 43, a frictional resistance, developing when disengaging the terminal, is reduced as described above.

In the charging connector terminal 55 thus constructed, muddy water or the like deposited on the outer peripheral surface of the electrical contact portion 21a can be wiped off, and therefore the insertion/disengagement force as well as damage and wear of the terminal can be prevented as in the above-mentioned charging connector terminals 11 and 41. Besides, the electrical contact portion 13 is of the slotted type, and is adapted to contact the electrical contact portion 21a through the contact plates 59 by the auxiliary spring 63. Therefore, the use of the spring 19, which requires complicated processing or working, is obviated, thereby reducing the cost, and besides even if muddy water or the like intrudes into the terminal, the muddy water or the like would not intrude into the stamped portions of the spring 19.

In the charging connector terminal 55 of this embodiment, although the ring member 67 is cut or interrupted at one portion thereof in the circumferential direction to assume a C-shape, it may be replaced by a ring member divided into four sections which are fixedly secured respectively to the contact plates 59. Also, in this case, the inner diameter of the ring member in its normal condition is smaller than the outer diameter of the electrical contact portion 21a.

As described in detail, in the charging connector terminal of the present invention, the O-ring is provided at that portion of the hollow portion disposed between the spring and the insertion port, and the muddy water discharge surface is provided at that portion of the hollow portion lying between the O-ring and the insertion port. With this construction, when the electrical contact portion of the male terminal is inserted into the insertion port, the O-ring is first brought into intimate contact with the electrical contact portion, and wipes muddy water or the like off the outer peripheral surface of the electrical contact portion. As a result, muddy water or the like will not adhere to the spring, and the resilient action of the spring is not adversely affected, and besides the insertion/disengagement force is prevented from being increased, and damage and wear of the terminal due to muddy water or the like are prevented.

What is claimed is:

1. A charging connector terminal comprising:
    an electrical contact portion of a tubular construction having an insertion port and a hollow portion into which a rod-like electrical contact portion of a male terminal is inserted, the hollow portion having a peripheral groove therein located adjacent the insertion port;
    resilient contact means contained in the hollow portion for resilient contact with the electrical contact portion of the male terminal; and
    a flexible ring member loosely fitted in the peripheral groove of the hollow portion, said ring member being interrupted at a portion thereof in a circumferential direction, and an inner diameter of said ring member being smaller than an outer diameter of the electrical contact portion of the male terminal while an outer diameter of said ring member is smaller than an inner diameter of the peripheral groove,
    wherein an inner peripheral surface of said flexible ring member is tapered so that a diameter of said inner peripheral surface of said flexible ring member increases in said terminal-inserting direction.

2. The charging connector terminal according to claim 1, wherein a muddy water discharge surface defined by a tapering surface is formed on a portion of the hollow portion lying between the peripheral groove and the insertion port, the muddy water discharge surface being flaring toward the insertion port.

3. The charging connector terminal according to claim 1, wherein said resilient contact means is a spring.

4. A charging connector terminal comprising:
    contact plates formed by dividing a tubular electrical contact portion by slits extending in a terminal-inserting direction, said contact plates being elastically displaceable at their distal end portions radially of the electrical contact portion and having a peripheral groove in inner surfaces thereof;
    an auxiliary spring mounted on outer surfaces of said contact plates in a circumferential direction; and
    a flexible ring member fitted in the peripheral groove of said contact plates, said ring member being interrupted at a portion thereof in the circumferential direction, and an inner diameter of said ring member being smaller than an outer diameter of an electrical contact portion of a male terminal,
    wherein an inner peripheral surface of said flexible ring member is tapered so that a diameter of said flexible ring member increases in said terminal-inserting direction.

5. The charging connector terminal according to claim 4, wherein said contact plates define an insertion port and a hollow portion into which the electrical contact portion of the male terminal is inserted.

6. The charging connector terminal according to claim 5, wherein said distal end portions of said contact plates are tapered such that said insertion portion is substantially conical with a diameter of said distal end portions decreasing in said terminal-inserting direction.

7. A charging connector terminal comprising:
    contact plates formed by dividing a tubular electrical contact portion by slits extending in a terminal-inserting direction, said contact plates being elastically displaceable at their distal end portions radially of the electrical contact portion and having a peripheral groove in inner surfaces thereof;
    an auxiliary spring mounted on outer surfaces of said contact plates in a circumferential direction; and
    a flexible ring member fitted in the peripheral groove of said contact plates, said ring member being interrupted at a portion thereof in the circumferential direction, and an inner diameter of said ring member being smaller than an outer diameter of an electrical contact portion of a male terminal,
    wherein said contact plates have an outer groove formed on the outer surfaces thereof extending in a circumferential direction, said auxiliary spring being mounted in said outer groove.

* * * * *